United States Patent Office 3,667,800
Patented June 6, 1972

3,667,800
TRANSPORTABLE CABIN
James D. R. Cuthbert, 1 The Glade,
Welwyn Garden, England
Filed Oct. 24, 1969, Ser. No. 869,296
Claims priority, application Great Britain, Oct. 25, 1968,
50,790/68
Int. Cl. B60p *3/34*
U.S. Cl. 296—23 G
15 Claims

ABSTRACT OF THE DISCLOSURE

This invention is a cabin having sides formed of rigid panels which can be easily collapsed for transport, possibly being towed behind a car in which case it can be mounted on wheels and axles. The cabin can have two floors but can still be folded into a package no larger than a conventional caravan by reason of an arrangement whereby the sides fold about for-and-aft hinges.

---

This invention relates to a cabin capable of being collapsed for storage or towing and yet capable of being easily erected on site to be in the form of a much more substantial building than a tent.

According to the present invention a cabin has two sides of rigid panels, the sides being hinged together at the top, and each side comprises two part sides hinged together, the cabin being capable of being collapsed by folding about the hinges to occupy a space substantially less in height and width than the erected cabin.

The cabin when collapsed will be capable of being towed in the manner of a caravan when mounted on a wheel and axle arrangement or indeed the wheel and axle arrangement may be permanently incorporated so that it can stand on it on the site where it is to be erected, possibly with the addition of struts supporting the part where the width is greater than the width of the wheel and axle arrangement.

A feature of the invention is the ease with which the cabin can be erected due to the main structure consisting of the two sides which can be simply folded over so that the apex where they join takes up a position near the bottom of one of the sides. When erected the height can be sufficient to have two floors, and one of the floors can be suspended from one side and arranged when erected to be supported by the opposite side.

Additional closure pieces for closing the front and back, can be hinged inside the part sides, and a ladder giving access to the first floor, furnishings and other components can be stored when the cabin is collapsed in an area defined between one lower part side and the adjacent part of the lower floor which are held in a rigid arrangement by interconnecting strut means.

One reason why a cabin of perhaps 12 or 13 feet height can be erected by levering at ground level resides in the very light weight of the rigid panels, and accordingly it is preferred that these panels are of a sheet material—possibly one or two inches thick—having a body of foam polystyrene or other cellular material with a protective outer layer of light thin sheet material and possibly also a protective inner layer. Such a sheet gives good insulation and weather protection and can be maintained rigid by timber or other frame members reinforcing it around the edges and at intermediate positions and then the frame members can carry the components of hinges and fastenings.

Figure 1:
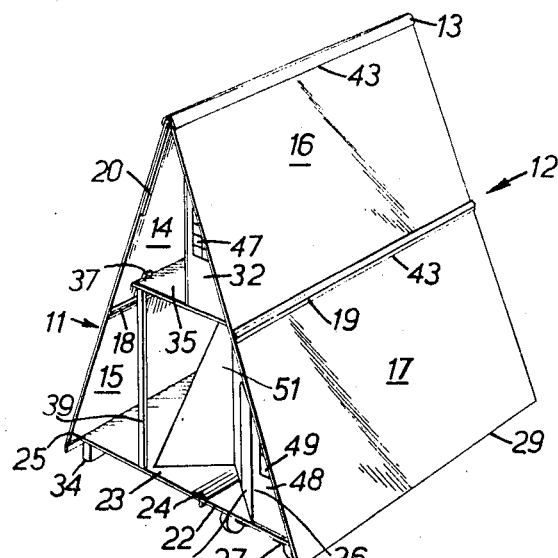
Figure 3:
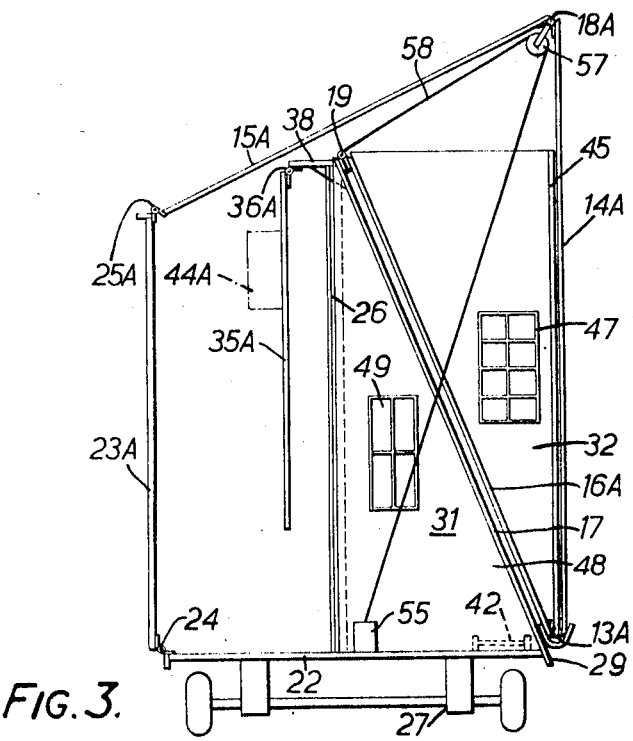
Figure 2:
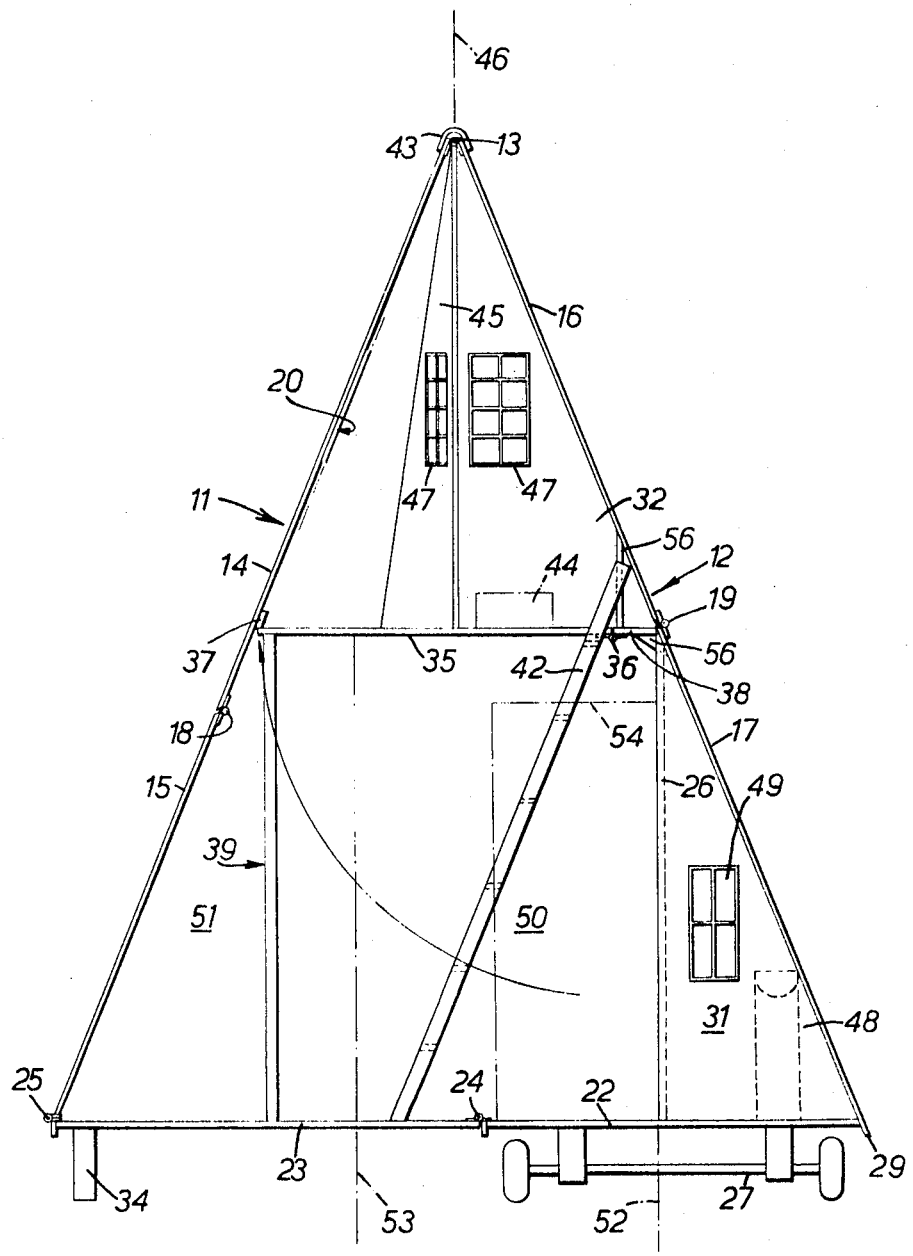

The invention can be carried into practice in various ways and one embodiment will be briefly described by way of example with reference to the accompanying drawing of which FIG. 1 is a sketch of a preferred embodiment, and
FIGS. 2 and 3 are perspective end views of the embodiment on an increased scale in the erected and collapsed condition.

The cabin has a pair of flat rigid sides 11 and 12 hinged together at the top at 13 in the manner of an inverted V.

Each side consists of two part sides 14 and 15 or 16 and 17 hinged together at 18 and 19 and each of these consists of a board comprising a light body portion of polyurethane foam of perhaps one inch thickness sandwiched between thin protective sheets. At least the outer sheet will be reasonably strong and weather-proof. The rigid part sides include timber frame members such as 20 around the edges and across the faces of the boards, which not only give rigidity but also carry hinges, joints and locating members.

Thus there is a timber joist extending along each of the four sides of each part-side and parallel timbers on the inner faces between the front and back edges.

The ground floor comprises a plywood board 22 fixed to the lower part side 17, and a movable board 23 hinged at 24 to the inner edge of the fixed board 22 to be capable of being turned upwards as indicated at 23A in FIG. 3. The outer edge of the board 23 is hinged at 25 to the lower edge of the part side 15.

The fixed board 22 and part side 17 are arranged in a rigid assembly by vertical struts 26, and this assembly is mounted on wheels and axles 27 for towing behind a car.

It will be seen that the part sides 16, 14 and 15, and the floorboard 23 can be turned to the position shown in FIG. 3 with the apex hinge 13A close to the bottom edge 29 of the fixed part side 17.

In that condition the external dimensions are no greater than those of a conventional caravan, so that the cabin can be easily towed.

Such items as a cooker, beds, and furniture can be stored during towing in the space 31 between the parts 17, 22 and 26, which space does not change shape during erection and collapse of the cabin.

On arrival at the site, erection is fairly easy. The owner stands on the floorboard 22 and pushes the floorboard 23A outwards (FIG. 3), possibly with the help of a lift at 13A from a colleague.

An upper end closure panel 32 defines a lower limit to the angle between the part sides 16 and 14, and initially they turn about the hinge 19, with this angle retained between them. Thus, when the hinge 13A has been lifted a few feet, there will be a reasonable length of torque arm about 19 to enable the owner's push on the floorboard 23A to continue turning the part sides about 19.

Once the part sides 14A and 15A come into the same plane, further turning causes the angle between the part sides 16A and 14A to increase to the final apex angle of the cabin. Then the part sides 14 and 15 come into the same plane just as the floorboard 23 reaches its final horizontal position, in which it can be supported by inserted struts shown at 34.

The other side is supported on the wheels and axles, and further struts can be used if desired at that side.

The upper floor has a major part 35 which hangs downwards during transit from a hinge 36 on a minor part 38 fixed to the part side 17 and panel 32 to give a rigid structure. After erection of the cabin, the part 35 is swung up about this hinge 36 and secured to lugs 37 on the inner face of the side 11. This floor will be a relatively heavy plywood board like the boards 22 and 23.

Although the cabin described is about 13 feet in total height giving two floors on which an adult can stand upright, and about 12 feet long, it can be collapsed to a size suitable for towing and can be easily erected because of the low weight of the panels forming the sides and the pivoting arrangement just described.

The front and back are closed by folding panels. An upper outwardly folding panel 45 hinged to the fixed panel 32 on the axis 46 can close the upper floor at each end. Each panel 32 and 45 has a window 47.

A similar fixed panel 48 with a window 49 closes each end of the space 31 and a folding lower wall 50, 51 is hinged to the panel 48 on the axis 52. This wall is double, with a hinge on the axis 53. The inner part 50 has a door 54, hinged on the part 26, and folds inwards during transit, while the outer panel folds outwards and can be secured to the part wall 15 by suitable lugs. The folding panels may have rising hinges.

The sides 11 and 12 overhang these front and back panels by one or two feet to give good weather protection.

All the gaps at the hinges 13, 19 and 18 are protected from the weather by flexible strips 43.

A ladder 42 in the space 31 is fitted on site for access to the upper floor. It can bear against the upper fixed part floor 38 at the rear to be parallel with the side 11 so that a man can climb it with full head room. This part floor 38 is made rigid by vertical struts 56 at front and rear.

Some articles of furniture are permanently fixed to the floor board as shown at 44.

In order to assist erection, and lowering, a winch 55 at one end of the floor 22 may have a cable 58 extending over a pulley 57 at the hinge 18A and thence to the hinge 19 for assisting lowering of the upper structure. The weight of the suspended parts acts as a counterweight.

Of course the relative dimensions given are examples only, and other arrangements are possible. In particular the wall 14 could be shorter and the walls 23 and 15 slightly longer to reduce the total height when collapsed.

In general upper parts will close over lower parts during erection to give the best protection against the weather.

What I claim as my invention and desire to secure by Letters Patent is:

1. A cabin comprising a pair of sides and a ridge hinge swingably connecting the sides together at an apex, each side comprising upper and lower part sides and a side hinge swingably connecting respective part sides together, one of said hinges being operable to permit swinging of its corresponding upper part side outwardly whereby said cabin may be collapsed by swinging the upper part sides and said apex outwardly and downwardly together about said one side hinge, said side hinges being at different distances from the ridge.

2. A cabin as claimed in claim 1 in which the hinges are all parallel and horizontal.

3. A cabin as claimed in claim 1 having an upper floor hinged to one of the sides and means for connecting the upper floor to the other side when the cabin has been erected and the upper floor has been lifted to a horizontal plane.

4. A cabin as claimed in claim 1 mounted on a wheel and axle arrangement for towing behind a car when collapsed.

5. A cabin as claimed in claim 1 including furniture secured to the floor to be erected with the floor.

6. A cabin as set forth in claim 1 wherein the other side hinge is operable to permit swinging of its corresponding upper part inwardly.

7. A cabin as claimed in claim 1 in which the rigid panels are constituted by sheet material comprising a cellular body and a lining.

8. A cabin as claimed in claim 7 in which the part sides comprising the sheet panels are reinforced by frame members.

9. A cabin as claimed in claim 1 including end panels hinged inside the part sides and capable of being opened out and fitted across the openings between the two sides at the ends after erection.

10. A cabin as claimed in claim 9 in which the end panels have access openings therein.

11. A cabin comprising a pair of sides and a ridge hinge swingably connecting the sides together at an apex, each side comprising upper and lower part sides and a side hinge swingably connecting respective part sides together, one of said side hinges being operable to permit swinging of its corresponding upper part side outwardly whereby said cabin may be collapsed by swinging the upper part sides and said apex outwardly and downwardly together about said one side hinge, said other side hinge being operable to permit swinging of its corresponding upper part inwardly, there being included a floor connected between the two lower part sides and comprising a fixed part joined to one lower part side, a folding part hinged to the other lower part side, and a hinge interconnecting the fixed part and the folding part, the hinges being all parallel and horizontal.

12. A cabin as claimed in claim 11 in which the two sides form an inverted V.

13. A cabin as claimed in claim 11 wherein the fixed part of the floor and the lower part side to which it is joined are braced by interconnecting strut means and present a rigid structure defining a space of constant shape in which components can be stowed when the cabin is collapsed.

14. A cabin as claimed in claim 2 having a floor connected between the two lower part sides and having a horizontal hinge fold.

15. A cabin as claimed in claim 4 in which the floor has a fixed part joined to one lower part side, a folding part hinged to the other lower part side and a hinge interconnecting the fixed part and the folding part.

References Cited

UNITED STATES PATENTS

| | | | |
|---|---|---|---|
| 2,725,602 | 12/1955 | Francis | 296—23 X |
| 2,762,084 | 9/1956 | Singer | 52—79 X |
| 3,082,899 | 3/1963 | Squier | 296—31 P X |
| 3,352,596 | 11/1967 | Escoto | 296—27 |
| 3,460,297 | 8/1969 | Fritz | 296—23 X |
| 3,397,908 | 8/1968 | Flajole | 296—23 |
| 2,670,986 | 3/1954 | Presnell | 296—27 X |

PHILIPP GOODMAN, Primary Examiner

U.S. Cl. X.R.

52—64; 296—27